United States Patent
Lin et al.

(10) Patent No.: US 6,999,225 B2
(45) Date of Patent: Feb. 14, 2006

(54) OPTICAL INTERFERENCE DISPLAY PANEL

(75) Inventors: Wen-Jian Lin, Hsinchu (TW);
Hsiung-Kuang Tsai, Taipei (TW)

(73) Assignee: Prime View International Co, Ltd.,
Hsinchu (TW)

( * ) Notice: Subject to any disclaimer, the term of this patent is extended or adjusted under 35 U.S.C. 154(b) by 21 days.

(21) Appl. No.: 10/807,142

(22) Filed: Mar. 24, 2004

(65) Prior Publication Data

US 2005/0036192 A1   Feb. 17, 2005

(30) Foreign Application Priority Data

Aug. 15, 2003   (TW) .............................. 92122565 A

(51) Int. Cl.
*G02B 26/00*   (2006.01)
(52) U.S. Cl. ...................... 359/291; 359/290; 359/295
(58) Field of Classification Search ........ 359/290–295; 445/24, 25
See application file for complete search history.

(56) References Cited

U.S. PATENT DOCUMENTS

| | | | |
|---|---|---|---|
| 4,310,220 A * | 1/1982 | Kuwagaki et al. .......... | 359/267 |
| 5,835,255 A | 11/1998 | Miles .......................... | 359/291 |
| 6,120,339 A * | 9/2000 | Alwan ......................... | 445/24 |
| 6,882,458 B1 * | 4/2005 | Lin et al. .................... | 359/247 |

* cited by examiner

*Primary Examiner*—Georgia Epps
*Assistant Examiner*—M. Hasan
(74) *Attorney, Agent, or Firm*—Hoffman, Wasson & Gitler PC

(57) ABSTRACT

An optical interference display panel is disclosed that has a substrate, an optical interference reflection structure, and a protection structure. The optical interference reflection structure has many color-changeable pixels and is formed on the substrate. The protection structure is adhered to the substrate with an adhesive and encloses the optical interference reflection structure between the substrate and the protection structure. The adhesive is used to hermetically isolate the optical interference reflection structure from water, dust and oxygen in the air. Moreover, the protection structure prevents the interference reflection structure from being damaged by an external force.

13 Claims, 3 Drawing Sheets

OPTICAL INTERFERENCE DISPLAY PANEL

BACKGROUND

1. Field of Invention

The present invention relates to a display panel. More particularly, the present invention relates to an optical interference display panel.

2. Description of Related Art

Due to being lightweight and small in size, a display panel is favorable in the market of the portable displays and other displays with space limitations. To date, in addition to liquid crystal display (LCD), organic electro-luminescent display (OLED) and plasma display panel (PDP), a module of the optical interference display has been investigated.

U.S. Pat. No. 5,835,255 discloses a modulator array, that is, a color-changeable pixel for visible light which can be used in a display panel. FIG. 1A illustrates a cross-sectional view of a prior art modulator. Every modulator 100 comprises two walls, 102 and 104. These two walls are supported by posts 106, thus forming a cavity 108. The distance between these two walls, the depth of cavity 108, is D. The wall 102 is a light-incident electrode which, according to an absorption factor, absorbs visible light partially. The wall 104 is a light-reflection electrode that is flexed when a voltage is applied to it.

When the incident light shines through the wall 102 and arrives at the cavity 108, only the visible light with wavelengths corresponding to the formula 1.1 is reflected back, that is, $$2D = N\lambda \tag{1.1}$$

wherein N is a natural number.

When the depth of the cavity 108, D, equals one certain wavelength $\lambda_1$ of the incident light multiplied by any natural number, N, a constructive interference is produced, and a light with the wavelength $\lambda_1$ is reflected back. Thus, an observer viewing the panel from the direction of the incident light will observe light with the certain wavelength $\lambda_1$ reflected back at him. The modulator 100 here is in an "open" state.

FIG. 1B illustrates a cross-sectional view of the modulator 100 in FIG. 1A after a voltage is applied to it. Under the applied voltage, the wall 104 is flexed by electrostatic attraction toward the wall 102. At this moment, the distance between the walls 102 and 104, the depth of cavity 108, becomes d and may equal zero.

The D in the formula 1.1 is hence replaced with d, and only the visible light with another certain wavelength $\lambda_2$ satisfying the formula 1.1 produces constructive interference in the cavity 108 and reflects back through the wall 102. However, in the modulator 100, the wall 102 is designed to have a high absorption rate for the light with the wavelength $\lambda_2$. Thus, the incident visible light with the wavelength $\lambda_2$ is absorbed, and the light with other wavelengths has destructive interference. All light is thereby filtered, and the observer is unable to see any reflected visible light when the wall 104 is flexed. The modulator 100 is now in a "closed" state.

As described above, under the applied voltage, the wall 104 is flexed by electrostatic attraction toward the wall 102 such that the modulator 100 is switched from the "open" state to the "closed" state. When the modulator 100 is switched from the "closed" state to the "open" state, the voltage for flexing the wall 104 is removed, and the wall 104 elastically returns to the original state, i.e. the "open" state, as illustrated in FIG. 1A.

However, the light-reflection electrode (the wall 104) is a membrane, typically made of metal, and generally is manufactured with a "sacrificial layer" technique widely used in the production of micro electro mechanical systems (MEMS). The light-reflection electrode is very thin and is easily damaged by even a tiny external force, inhibiting it from functioning properly. Moreover, the cavity 108 that spaces the two walls 102 and 104 is hollow. In practice, an external environment usually affects and lowers the display performance of the color-changeable pixel 100 because of the thin cavity 108.

For example, water in the air tends to adsorb into the cavity 108. The depth D of the cavity is typically less than 1 μm, and therefore the adsorbed water generates an undesirable electrostatic attraction between the two electrodes. When the color-changeable pixel 100 is supposed to be in the "open" state, the electrostatic attraction created by the adsorbed water causes the two walls to be attracted to each other, and the color-changeable pixel 100 thus appears to be in a "closed" state. The light-reflection electrode can also be hindered from normal switching by dust from the air which can enter into the cavity 108. Additionally, the two thin walls 102 and 104 are easily oxidized by air to such an extent that their optical or electrical properties are adversely affected.

SUMMARY

It is therefore an objective of the present invention to provide an optical interference display panel that protects an optical interference reflection structure therein from damage by an external environment.

It is another objective of the present invention to provide an optical interference display panel to reduce the possibility that water, dust or oxygen in the air damages the optical interference reflection structure.

It is still another objective of the present invention to provide an optical interference display panel with enhanced display performance, increased reliability and prolonged lifetime.

In accordance with the foregoing and other objectives of the present invention, an optical interference display panel is provided. The optical interference display panel has a substrate, an optical interference reflection structure, and a protection structure. The optical interference reflection structure is formed on the substrate. The protection structure is adhered to the substrate with an adhesive, thus enclosing the optical interference reflection structure between the substrate and the protection structure. The adhesive is used to isolate the optical interference reflection structure from water, dust and oxygen in the air. Moreover, the protection structure prevents the interference reflection structure from being damaged by an external force.

According to one preferred embodiment of the invention, the optical interference reflection structure comprises a plurality of color-changeable pixels. The substrate and the protection structure are airtight to prevent the optical interference reflection structure from being damaged by an external environment. The protection structure is a flat structure, such as a glass substrate, or a substrate made of other material like plastic, organic polymer or inorganic polymer. The adhesive comprises a material such as a UV glue or a thermosetting adhesive.

Moreover, the adhesive further comprises spacers that provide and maintain a predetermined distance between the protection structure and the substrate in order to prevent the protection structure from damaging the optical interference reflection structure. According to another preferred embodiment, the protection structure can be a U-shaped structure.

To manufacture the invention, a first electrode and a sacrificial layer are formed in order on the substrate, and then a plurality of openings are formed in the first electrode and the sacrificial layer. One support is formed in each of the openings, and a second electrode is then formed on the sacrificial layer and the supports. After that, the sacrificial layer is removed by a release etching process to form a cavity.

Next, a protection structure is adhered to the substrate such that the optical interference reflection structure is positioned between the protection structure and the substrate. A pressing procedure is used to make the adhesion between the protection structure and the substrate closer and tighter. In addition, if the adhesive is the thermosetting adhesive, a heating procedure can be used to heat the thermosetting adhesive in order to solidify and fix it.

The optical interference display panel provides a protection structure to adhere to the substrate for enclosing the optical interference reflection structure, thus preventing the optical interference reflection structure from being damaged by an external force. Moreover, the adhesive hermetically seals the optical interference reflection structure within the display panel, effectively preventing an external environment such as water, dust or oxygen in the air, from being in contact with the optical interference reflection structure and generating electrostatic attraction or oxidizing it to adversely affect its optical or electrical properties. In conclusion, the invention improves the display performance of the optical interference display panel, decreases the quantity of defective pixels, and prolongs the lifetime thereof.

It is to be understood that both the foregoing general description and the following detailed description are examples and are intended to provide further explanation of the invention as claimed.

BRIEF DESCRIPTION OF THE DRAWINGS

These and other features, aspects, and advantages of the present invention will become better understood with regard to the following description, appended claims, and accompanying drawings where:

DESCRIPTION OF THE PREFERRED EMBODIMENTS

Figure 1A:
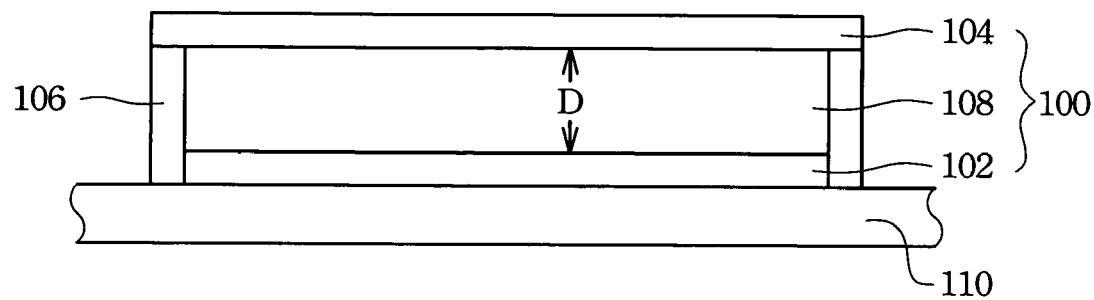
FIG. 1A illustrates a cross-sectional view of a prior art modulator.
Figure 1B:
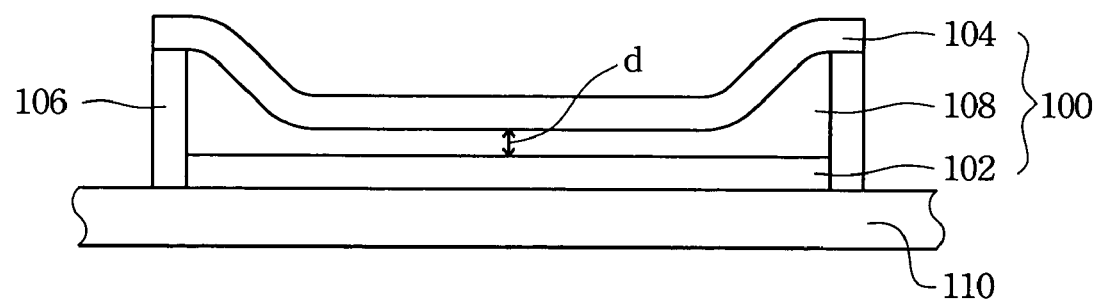
FIG. 1B illustrates a cross-sectional view of the modulator in FIG. 1A after a voltage is applied to it.

Reference will now be made in detail to the present preferred embodiments of the invention, examples of which are illustrated in the accompanying drawings. Wherever possible, the same reference numbers are used in the drawings and the description to refer to the same or like parts.

The optical interference display panel has a substrate, an optical interference reflection structure, and a protection structure. The optical interference reflection structure has a plurality of color-changeable pixels, and is formed on the substrate. The protection structure is adhered to the substrate with an adhesive, thus enclosing the optical interference reflection structure between the substrate and the protection structure. The adhesive is used to isolate the optical interference reflection structure from water, dust and oxygen in the air. Moreover, the protection structure prevents the interference reflection structure from being damaged by an external force.

Figure 2A:
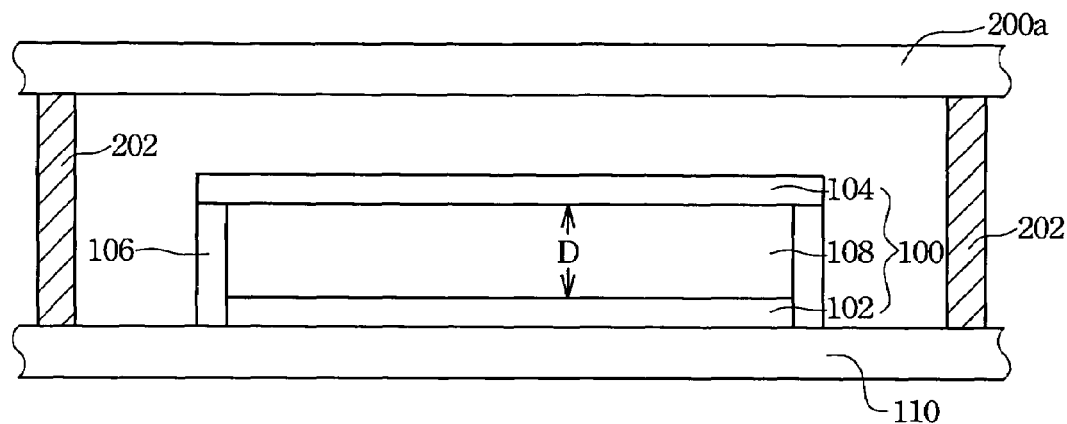
FIG. 2A illustrates a cross-sectional view of one preferred embodiment of the invention.

FIG. 2A illustrates a cross-sectional view of one preferred embodiment of the invention. The optical interference reflection structure has a plurality of color-changeable pixels. For clarity and ease of understanding, the following descriptions and figures use only one color-changeable pixel 100 to represent the optical interference reflection structure inside the optical interference display panel of this preferred embodiment.

As illustrated in FIG. 2A, a flat protection structure 200a is adhered to a substrate 110 with an adhesive 202. The substrate 110 is a glass substrate or a substrate transparent to visible light. The flat protection structure 200a reduces the possibility that an external force reaches the color-changeable pixel 100. Moreover, the adhesive 202 seals the optical interference reflection structure between the substrate 110 and the flat protection structure 200a. The adhesive 202 is used to isolate the color-changeable pixel 100 from an external environment and prevent it from being damaged by water, dust and oxygen in the air.

When water in the air gets into the cavity 108 of the color-changeable pixel 100, the electrostatic attraction caused by the water is very large because the depth D of the cavity is very small, and the color-changeable pixel 100 is inhibited from being switched successfully. When the metal film, such as the light-incident electrode or the light-reflection electrode of the color-changeable pixel is in contact with oxygen, the metal film is very easily oxidized, and the optical and electrical properties of the color-changeable pixel 100 are adversely affected.

In the preferred embodiment, the adhesive 202 is not only used to adhere the flat protection structure 200a to the substrate 110 but also to isolate the color-changeable pixel 100 from an external environment. The high isolation effectively protects the color-changeable pixel 100 from damage. According to one preferred embodiment of the invention, when the adhesive joins the flat protection structure 200a to the substrate 110 such that the color-changeable pixel is hermetically sealed, the reliability and the lifetime of the color-changeable pixel are substantially increased.

The flat protection structure 200a is a glass structure, or a substrate made of other material like plastic, organic polymer or inorganic polymer. The adhesive 202 comprises a material such as a UV glue or a thermosetting adhesive. However, other adhesives suitable for adhering the protection structure and the substrate are available to be used in the invention and are not limited by this embodiment.

In addition, during the adhering of the flat protection structure 200a to the substrate 110, a pressing procedure is usually used to position the flat protection structure 200a and the substrate 110 closer and tighter. In order to prevent the flat protection structure 200a from crushing the wall 104 of the color-changeable pixel 100, or to prevent the protection structure from being shifted or tilted to the substrate 110 by an external force, the preferred embodiment adds spacers into the adhesive 202.

The adhesive 202 with spacers keeps a predetermined distance between the flat protection structure 200a and the substrate 110 and prevents the flat protection structure 200a from damaging the color-changeable pixel 100. In one example of the preferred embodiment, the size of the spacers is about 100 μm, and the size of the color-changeable pixel 100 is typically less than 1 μm. Therefore, there is a very large distance between the flat protection structure 200a and the wall 104, thus avoiding the foregoing possibility of being crushed.

Figure 2B:
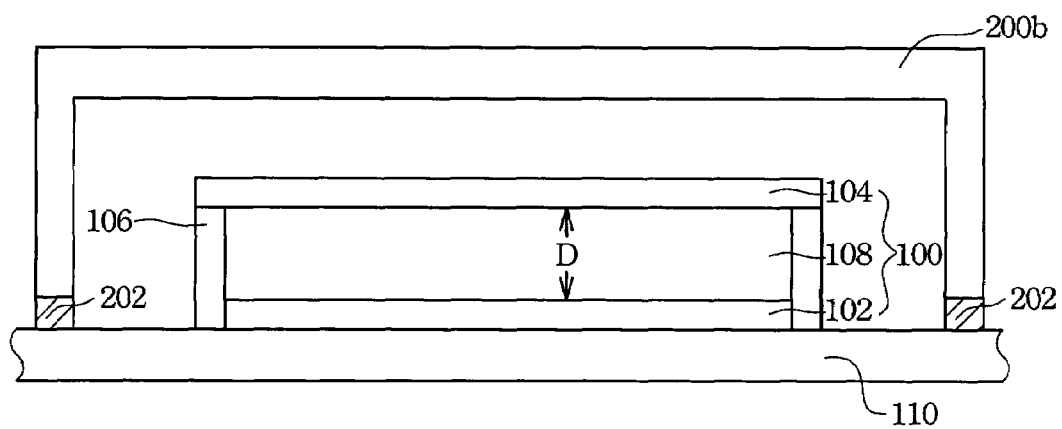
FIG. 2B illustrates a cross-sectional view of another preferred embodiment of the invention.

FIG. 2B illustrates a cross-sectional view of another preferred embodiment of the invention. In this preferred embodiment, the protection structure is a U-shaped protection structure 200b. The U-shaped protection structure 200b is a flat protection structure having extended sides. Similarly, the U-shaped protection structure 200b is adhered to the substrate 110 with the adhesive to isolate the color-changeable pixel 100 from water, dust and oxygen in the air and also to prevent the color-changeable pixel 100 from being damaged by an external force.

Figure 3A:
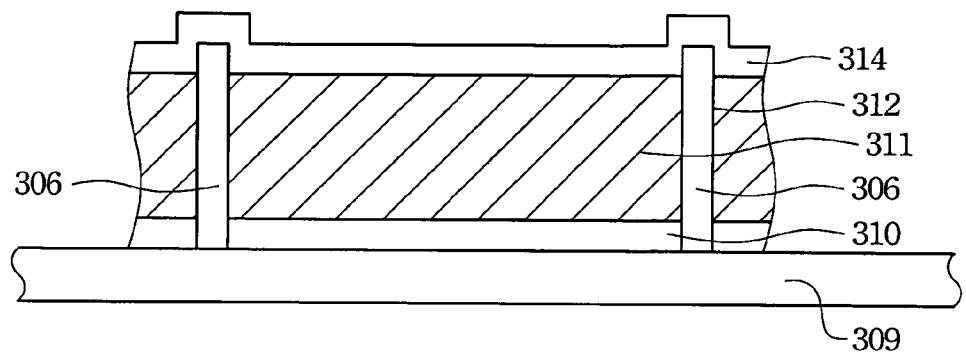
FIGS. 3A to 3B depict a method for manufacturing the preferred embodiment in FIG. 2A.
Figure 3B:
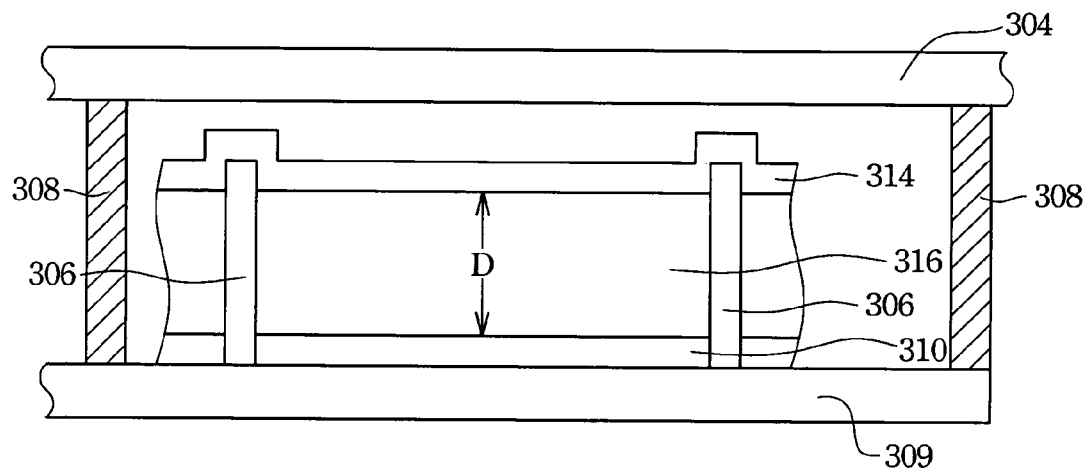

FIGS. 3A to 3B depict a method for manufacturing the embodiment in FIG. 2A. Reference is made to FIG. 3A first, in which a first electrode 310 and a sacrificial layer 311 are formed in order on a transparent substrate 309. Openings 312 are formed in the first electrode 310 and the sacrificial layer 311, and every opening 312 is suitable for forming one support 306 therein. Next, supports 306 are formed in the openings 312, and a second electrode 314 is formed on the sacrificial layer 311 and the supports 306.

Reference is made to FIG. 3B, in which the sacrificial layer 311 is removed by a release etching process, such as a remote plasma etch process, to form a cavity 316. The depth D of the cavity 316 is the thickness of the sacrificial layer 311. Afterward, a flat protection structure 304 is adhered to the substrate 309 with an adhesive 308. A pressing procedure is used to make the adhesion between the flat protection structure 304 and the substrate 309 closer and tighter. In addition, if the adhesive 308 is a thermosetting adhesive, a heating procedure can be used to heat the thermosetting adhesive so as to solidify and fix it.

The foregoing description explains the method for manufacturing the optical interference display panel having the flat protection structure. The manufacturing method for the optical interference display panel having the U-shaped protection structure is similar and is described below for clarity.

First, an optical interference reflection structure, which comprises the first electrode, the second electrode and the supports therebetween, is formed on the substrate. Then, a U-shaped protection structure is adhered to the substrate such that the optical interference reflection structure is positioned between the U-shaped protection structure and the substrate. A pressing procedure is used to make the adhesion between the U-shaped protection structure and the substrate closer and tighter.

The optical interference display panel provides a protection structure that is adhered to the substrate and encloses the optical interference reflection structure, thus preventing the optical interference reflection structure from being damaged by an external force. Moreover, the adhesive seals the optical interference reflection structure within the display panel, effectively preventing an external environment, such as water, dust or oxygen in the air, from being in contact with the optical interference reflection structure and generating electrostatic attraction or oxidizing it to adversely affect its optical or electrical properties. In conclusion, the invention improves the display performance of the optical interference display panel, decreases the quantity of defective pixels, and prolongs the lifetime thereof.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An optical interference display panel, comprising:
   a substrate;
   a protection structure, adhered to the substrate with an adhesive; and an optical interference reflection structure, located between the substrate and the protection structure;
   wherein the adhesive comprises spacers, and the spacers keep a predetermined distance between the protection structure and the substrate to prevent the protection structure from damaging the optical interference reflection structure.

2. The optical interference display panel of claim 1, wherein the optical interference reflection structure comprises:
   a first electrode;
   a second electrode, wherein the second electrode is situated in parallel with the first electrode substantially; and
   a support, located between the first electrode and the second electrode to form a cavity.

3. The optical interference display panel of claim 1, wherein the protection structure is a flat protection structure or a U-shaped protection structure.

4. The optical interference display panel of claim 1, wherein a material of the protection structure is glass, plastic, organic polymer or inorganic polymer.

5. The optical interference display panel of claim 1, wherein the substrate and the protection structure are airtight to prevent the optical interference reflection structure from being damaged by an external environment.

6. The optical interference display panel of claim 1, wherein the adhesive comprises a UV glue or a thermosetting adhesive.

7. A method for manufacturing an optical interference display panel, the method comprising:
   providing a substrate;
   forming an optical interference reflection structure on the substrate; and
   adhering a protection structure to the substrate in order to position the optical interference reflection structure between the protection structure and the substrate;
   wherein the adhesive comprises spacers, and the spacers keep a predetermined distance between the protection structure and the substrate to prevent the protection structure from damaging the optical interference reflection structure.

8. The method of claim 7, wherein the apical interference reflection structure comprises:
   forming a first electrode on the substrate;
   forming a sacrificial layer on the first electrode;
   forming a plurality of first openings in the first electrode and the sacrificial layer;
   forming a support in each of the first opening;
   forming a second electrode on the sacrificial layer and the supports; and
   removing the sacrificial layer by a release etching process.

9. The method of claim 7, wherein the protection structure is a flat protection structure or a U-shaped protection structure.

10. The method of claim 7, wherein a material of the protection structure is glass, plastic, organic polymer or inorganic polymer.

11. The method of claim 7, wherein the substrate and the protection structure are airtight to prevent the optical interference reflection structure from being damaged by an external environment.

12. The method of claim 7, wherein the adhering step comprises adhering the protection structure and the substrate with an adhesive.

13. The method of claim 12, wherein the adhesive comprises a UV glue or a thermosetting adhesive.

* * * * *

UNITED STATES PATENT AND TRADEMARK OFFICE
CERTIFICATE OF CORRECTION

| | |
|---|---|
| PATENT NO. | : 6,999,225 B2 |
| APPLICATION NO. | : 10/807142 |
| DATED | : February 14, 2006 |
| INVENTOR(S) | : Lin et al. |

It is certified that error appears in the above-identified patent and that said Letters Patent is hereby corrected as shown below:

On the Title Page (75), in column 1, under Inventors, line 1, delete "(TW);" and insert -- (TW) R.O.C.; --, therefor.

On the Title Page (75), in column 1, under Inventors, line 2, after "(TW)" and insert -- R.O.C. --.

On the Title Page (73), in column 1, under Assignee, line 2, after "(TW)" and insert --R.O.C. --.

In column 6, line 54, in Claim 8, delete "apical" and insert -- optical --, therefor.

Signed and Sealed this

Twentieth Day of November, 2007

JON W. DUDAS
*Director of the United States Patent and Trademark Office*

UNITED STATES PATENT AND TRADEMARK OFFICE
Certificate

Patent No. 6,999,225 B2            Patented: February 14, 2006

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Wen-Jian Lin, Hsinchu (TW) R.O.C.; Hsiung-Kuang Tsai, Taipei, (TW) R.O.C.; and Mark W. Miles, San Francisco, CA (US).

Signed and Sealed this Nineteenth Day of February 2008.

<div style="text-align:right">

RICKY L. MACK
*Supervisory Patent Examiner*
Art Unit 2873

</div>